(12) United States Patent
Brasche et al.

(10) Patent No.: US 7,519,470 B2
(45) Date of Patent: Apr. 14, 2009

(54) LOCATION-BASED CACHING FOR MOBILE DEVICES

(75) Inventors: Goetz P Brasche, Aachen (DE); Robert Fesl, Germering (DE); Wolfgang Manousek, Dormagen (DE); Ivo W Salmre, Aachen (DE)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/375,995

(22) Filed: Mar. 15, 2006

(65) Prior Publication Data

US 2007/0219708 A1 Sep. 20, 2007

(51) Int. Cl.
G01C 21/00 (2006.01)
(52) U.S. Cl. .................. 701/207; 701/200; 701/211; 340/995.12; 340/995.17; 340/995.18; 711/3; 711/100; 711/E12.04; 711/E12.051
(58) Field of Classification Search .............. 701/207, 701/211, 200; 340/995.12, 995.17, 995.18; 711/3, 100, E12.04, E12.051
See application file for complete search history.

(56) References Cited

U.S. PATENT DOCUMENTS

| | | | | |
|---|---|---|---|---|
| 6,405,123 | B1 * | 6/2002 | Rennard et al. | 701/200 |
| 6,615,131 | B1 * | 9/2003 | Rennard et al. | 701/200 |
| 6,680,919 | B1 | 1/2004 | Rauhala | |
| 2002/0090925 | A1 | 7/2002 | Ramaswamy et al. | |
| 2005/0073459 | A1 | 4/2005 | Dodson | |
| 2005/0125143 | A1 * | 6/2005 | Beesley et al. | 701/200 |
| 2006/0069503 | A1 * | 3/2006 | Suomela et al. | 701/211 |
| 2006/0080032 | A1 * | 4/2006 | Cooper et al. | 701/208 |
| 2006/0116817 | A1 * | 6/2006 | Salmre et al. | 701/211 |
| 2006/0156209 | A1 * | 7/2006 | Matsuura et al. | 714/798 |
| 2006/0271286 | A1 * | 11/2006 | Rosenberg | 701/211 |

FOREIGN PATENT DOCUMENTS

| | | | |
|---|---|---|---|
| JP | 16040321 A | | 2/2004 |
| JP | 2005198345 A | * | 7/2005 |
| KR | 10-2006-0008100 A | | 1/2006 |

OTHER PUBLICATIONS

Markoff, John et al., With a Cellphone as My Guide, Jun. 28, 2006, http://www.nytimes.com/2006/06/28/technology, New York Times.
International Search Report dated Jul. 26, 2007 for Application No. PCT/US2007/003704, 10 pages.

* cited by examiner

Primary Examiner—Khoi Tran
Assistant Examiner—Jorge O Peche

(57) ABSTRACT

A location-based caching system provides the ability for a mobile communication device to dynamically provide content related to a user's location. Content may comprise a series of map segments that anticipate the route traveled by a user of the mobile device. Other related content may also be provided, for example, point of interest information related to the route traveled. The system tracks a present location of the mobile device and predicts a future location of the mobile device. Based upon the prediction of future location, the caching module determines whether content related to the future location is presently stored on the mobile device. If appropriate content is not on the mobile device, the caching module retrieves the content from a content server via a network connection. The content information nay be contextually selected based upon, for example, user preferences, movement information, and device state information.

19 Claims, 9 Drawing Sheets

LOCATION-BASED CACHING FOR MOBILE DEVICES

BACKGROUND OF THE INVENTION

Generally, navigation applications for mobile devices operate by downloading a map to the device corresponding to a pre-calculated route or an estimated area in which the user of the mobile device intends to travel. Using a mapping service, generally offered by a web-based provider or data maintained on a personal computer or server, the user specifies a starting point, a destination, and potentially stop-over destinations and a static route based upon the these locations is then calculated. A complete map of the route is downloaded to the mobile device.

There are significant limitations to these existing navigation applications. First, the navigational route is static and bound to a given starting point and destination. There is no ability to dynamically change the route stored in the mobile device should a user determine to alter course. Second, in most cases the map data is vector-based and only one map type is supported, i.e., the resolution may be adapted, but it is not possible to change the map type, for example, from a street map to an aerial view, a topographical view, or other potential view. Further, such navigational applications do not account for limitations on device capabilities, for example, limited memory for map storage and limited processor allocation. Additionally these navigational applications in most cases only support map data rather than any kind of location-based data that maybe of interest to the user of the mobile device.

SUMMARY

A location-based caching system provides the ability for a mobile communication device to dynamically provide content related to a user's location. In an exemplary form, the content comprises a series of map segments that anticipate the route traveled by a user of the mobile device. Other related content may also be provided, for example, point of interest information related to the route traveled. The content information may be contextually selected based upon, for example, user preferences, movement information, and device state information.

The mobile device may be composed of several components that facilitate the location-based caching system including a location determination module, a direction estimator module, a content container, a content container, a connection management module, and a caching module. The location determination module determines a present location of the mobile communication device. The direction estimator module estimates a future location of the mobile communication device. The content container stores content related to the future location. The connection management module provides network connectivity to the mobile communication device. The caching module selects the content related to the future location from the content container or an alternative content source external to the mobile communication device via the connection management module. The system may further include a content server that provides the content related to the future location to the mobile communication device via a network connecting the mobile communication device and the content server. The system may also include a source of present location information about the mobile communication device accessible by the mobile communication device, for example, global satellite positioning information.

The location-based caching system tracks a present location of the mobile communication device and predicts a future location of the mobile communication device. Based upon the prediction of future location, the caching module determines whether content related to the future location is presently stored on the mobile communication device. If appropriate content is not on the mobile device, the caching module retrieves the content from a content server via the network connection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION OF THE INVENTION

The technology disclosed herein is designed to provide a mobile communication device map data and other content that is specific to the user's location and interest, but independent of a route calculated for the user. The provision of map data is intelligently and dynamically downloaded to the mobile communication device as needed. This technology is referred to generally herein as a location-based caching system.

Map data may be provided to a mobile device according to multiple parameters including the following: direction of movement, speed (current and average), and context. Context can further be understood in terms of a global context, i.e., the environment or geographical location of the user, and a local context, i.e., a user profile including preferences, interests, position of the user, and hardware and software capabilities and limitations of the mobile device.

The resolution of a selected map may depend on the speed of travel, context (e.g., the inclusion of points of interest), available map data, and limitations or caps on the mobile communication device (e.g., memory, display size and resolution, and processor speed). The maps selected for presentation on the mobile device are thus adapted to match the pertinent criteria. The interval of downloads to the mobile device may also depend on context including speed of travel of the user, connection options and speeds, and memory allocation.

Based on an analysis of the positional and contextual information, segments of map data may be calculated based upon, for example, size and resolution and downloaded from a content server to the mobile device. Map segments may also be deleted from the mobile device based upon similar criteria. The map data may also be enriched by multi-media data with location information. The benefits of the location-based caching system may be enhanced by the combination with smart connection management and location management technologies.

Figure 1:
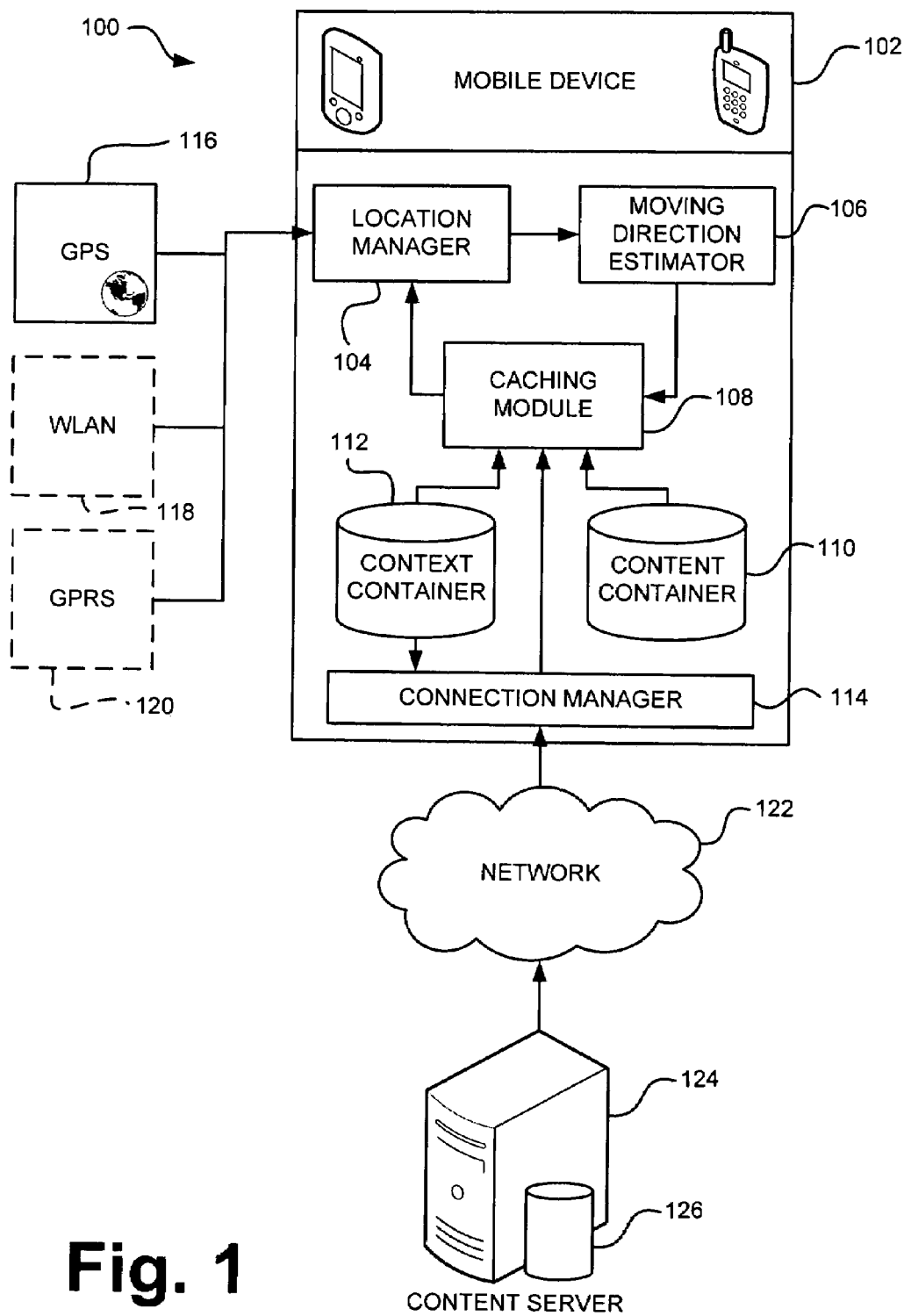
FIG. 1 is a schematic diagram of a relationship of a mobile device to a content server and geographic location information sources.

A location-based caching system 100 is depicted in FIG. 1. The system 100 is generally a client-server model and is based around a mobile device 102. The mobile device 102 may be a mobile telephone, a personal digital assistant, a mobile storage device (e.g., an MP3 player or portable photograph/video library), a global positioning system device, an automotive information center (e.g., ONSTAR by General Motors Corporation), or any other portable device capable of receiving geographic position data and interfacing with a network 122 to receive additional content. A content server 124 connects with the mobile device 102 via a network 122. The system 100 may also include a global positioning system (GPS) service 116, or other methodology to determine the geographic location of the mobile device 102, that interfaces with the mobile device 102.

The mobile device 102 has several modules or components for implementing location-based caching operations as indicated in FIG. 1. These modules may include a location manager module 104, a moving direction estimator module 106, a caching module 108, and a connection manager module 114. The location manager module 104, the moving direction estimator module 106, and the caching module 108, together primarily implement the intelligent and dynamic selection of map data for presentation on the mobile device 102. In addition, the mobile device 102 may include a content container 110 for storage of map data and a context container 112 for storage of user preferences or other contextual information. The content container 110 and the context container 112 may take the form of data structures within a general memory of the mobile device 102.

As shown in the embodiment of FIG. 1, the mobile device 102 may communicate with the content server 124 through a connection with one or more networks 122. The network 122 may be any type of network, for example, a local area network (LAN), a wireless local area network (WLAN), a wide area network (WAN), the Internet, a telephony network, a microwave network (e.g., WiMAX), a radio network (e.g., GPRS), or an optical network, or combinations thereof.

The mobile device 102 may have the ability to connect with multiple networks simultaneously. For example, if the mobile device 102 is a wireless telephone, it may connect with a voice telephony network using the Global System for Mobile Communication (GSM) standard, the Code Division Multiple Access (CDMA) standard, the Universal Mobile Telecommunications System (UMTS) standard, or any other network telephony standard. Data can be alternately or simultaneously transmitted using Circuit Switched Data (CSD), General Packet Radio Service (GPRS), High Speed Downlink Packet Access (HSDPA), or any other data transfer protocol.

The network connection may be managed by the connection manager 114. The connection manager 114 is responsible for selecting the best network connection for downloading data from the content server 124 to the mobile device 102 based upon the hardware available. One exemplary implementation of a suitable connection manager module is embodied in the MICROSOFT WINDOWS MOBILE platform. Exemplary connection types may include Bluetooth, GPRS, WLAN, and UMTS. It is also possible to choose more than one connection type if the mobile device 102 is equipped to handle multiple protocols or has multiple communication interfaces. The selection of the most appropriate data transfer option may depend upon a number of factors including the amount of data to be transferred, the available connection types, operations presently being performed by the mobile device, and any user preferences defined in the context container 112. For example, if the user is using a web browser application on the mobile device 102 and is presently downloading information using the GPRS protocol over a WLAN, the connection manager 114 may direct that map data be downloaded via an available Bluetooth interface. When the WLAN connection is free, the connection manager 114 may redirect the downloading operations to occur via the WLAN interface because of higher data transfer rates.

The content server 124 includes a data store 126 and a connection service to provide an interface between the content server 124 and the mobile device 102. The data store 126 stores the map data to be uploaded on demand to the mobile device 102. In an exemplary embodiment, the connection service may be a web service. The primary function of the web service is to provide the necessary map data responsive to the estimated moving direction of the mobile device 102. The web service provided by the content server 124 may further select map data from the data store 126 based upon contextual information provided by the context container 112 in the mobile device 102.

As indicated in FIG. 1, the mobile device may receive geographic position data directly from the GPS service 116 or alternatively from other sources. In order receive geographic positioning data from a GPS service 116, the mobile device 102 is generally equipped with a GPS receiver chip or it is connected with an external GPS device via cable or Bluetooth. Such a GPS receiver is tuned to receive signals from global positioning satellites and triangulate the position of the mobile device 102. In the embodiment of FIG. 1, such a GPS device would be incorporated into a location manager module 104 further described below.

Alternatively, the mobile device 102 may determine a geographic position by interfacing with a WLAN 118, a GPRS network 120, or any other wireless network technology standards using a plurality of transponders. If there are at least three wireless transmission sources providing the network within range of the mobile device 102, the location manager 104 in the mobile device 102 can triangulate a geographic position based upon the fixed positions of the wireless network transponders. The location manager 104 can query the transponders to provide such fixed positional information.

Geographic position may further be determined by direct data input by the user of the mobile device 102 or any position source. The location manager 104 may be equipped to use any or all sources of location information, i.e., GPS, other triangulation methodologies, direct input, or any other methodology, to determine a geographic position. The mobile device 102 is agnostic to the source of the location information when further determining appropriate map data for presentation.

The moving direction estimator 106 receives the actual geographical position of the mobile device 102 from the location manager 104 and estimates direction the user of the mobile device 102 will move. This estimation may be calculated based upon this actual position information, the direction traveled by the user within a prior time period (e.g., within the last few minutes or seconds; the period may further depend upon the speed of the user), environmental context information, and user context information. For example, the user may be in a car traveling at a constant speed down a highway. This environmental context information may be extrapolated based upon map coordinates and speed. The moving direction estimator 106 may thus determine from this context that the user will continue to travel down the highway. Alternatively, if the speed of the user decreases over a period of a few seconds and the maps of the area indicate an intersection with another road, such information may suggest a potential change of direction of the user and the system 100 can prepare to accommodate such a change.

The moving direction estimator 106 may calculate the future estimated position of the user using any of several different algorithms. Exemplary algorithms include any linear or nonlinear extrapolations of the tracked route. Extrapolation means that the algorithm should be able to estimate from stored points of the tracked route a position where the user of the device may be in an amount of time with highest possible probability. A particular algorithm may be chosen for any of a variety of reasons, for example, the speed of the processor in the mobile device 102, memory allocation requirements, or the number of variables desired for consideration. The moving direction estimator 106 may be open for implementing application-specific algorithms as well.

Once determined by the moving direction estimator 106, the estimated position is then provided to the caching module 108 to initiate a preload all relevant maps and other data. The caching module 108 determines, depending on the position of the user and the current context, whether data should be pre-loaded from the content server 124 and whether data in the local content container 110 can be deleted. In case of a request of data (e.g., maps) from the location manager 104, the caching module 108 retrieves this data normally from the local content container 110. Otherwise, if the data is not locally stored, the data must be uploaded from the content server 124 immediately. Further, if mobile device 102 has little available storage in its memory, the caching module 108 purges data from the content container 110 identified as the greatest distance from the actual position or the expected position of the user. The caching module 108 also purges data from the context container 112 that is least applicable to the actual or expected position of the user.

The content container 110 is a data store for location-based data. In one implementation, the content container 110 may be a simple binary file to minimize the necessary resources of the mobile device 102. In another implementation, content container 110 may be a mobile database. In one implementation using an object-oriented data structure, the location-based data may be encapsulated within a class with the following exemplary interfaces:

a) calculation of distance between data and current given position of the user;
b) type of the location-based data;
c) amount of the location-based data;
d) priority of the location-based data; and
e) a Get-function for the location-based data.

These data classes may be structured in a container-class holding all of these objects (in case of a database this container class is only the interface). The container-class may provide the following exemplary interfaces:

a) get a list of objects with a minimum distance to a given point;
b) get a list of objects with a minimum distance to a given line;
c) get a list of objects with a minimum distance to a given area;
d) get a list of objects within a given area;
e) add object(s); and
f) remove object(s).

In this manner, maps and other content stored in the content container 110 on the mobile device 102 (i.e., the "objects" in memory) can be compared to a present position of the user allowing the caching module 108 to make appropriate next map selections and memory allocation decisions. For example, if the caching module 108 determines that available memory for storage of maps and content is running low, those maps farthest from the user's position may be discarded to provide storage space for adding maps and content more relevant to the present position of the user.

The context container 112 is a data store for all relevant context data and preferences of the user of the mobile device 102. Exemplary preferences may include the following:

a) available storage on the mobile device 102;
b) average moving speed of the user:
c) preferred mean(s) of transportation;
d) available/preferred types of position dependent data;
e) available/preferred types of maps;
f) available memory space or processor allocation on the mobile device 102;
g) size and resolution of the display on the mobile device 102;
h) available connection types on the mobile device 102; and
i) preferred connection types depending on costs.

These data may be provided by a single class/object and may be configurable through a user interface on the mobile device 102. Many of the parameters may be calculated automatically, if possible, to avoid user input.

The purpose of collecting and using this type of contextual data is to provide the user with a map most appropriate to the circumstances. For example, the caching module 108 may select alternate maps based upon the movement of the user. If it is apparent that the user is moving at speeds only attainable by a moving vehicle, the caching module 108 will select road maps covering a large area (e.g., scaled in miles or kilometers) at a very low level of detail. If the personal preference information of a user indicates that the user usually travels by train, the caching module 108 may select maps with the train routes and stations identified. Alternately, if the speed of the user suggests that the user is walking, the caching module 108 may select maps covering a small area (e.g., scaled in feet or meters) with a high level of detail.

Various levels of contextual detail in maps may be intelligently provided to the user depending upon known user preferences taken into account by the caching module 108 when selecting particular maps to download from a content server 124. If the personal preference information of the user indicates that the user loves to frequent coffee shops or brew pubs, known coffee shop or brew pub locations may be presented as signposts on the maps. If user preference information indicates the user is on a vacation trip, signpost information may be provided on a map indicating historical or tourist sites (e.g., battlefields along a highway or museums in a city) in the viewable area of the maps. Further signpost information may indicate the direction of certain attractions off the viewable area of the displayed map.

Note that there need not be a central content server, but instead content may be retrieved from a plurality of distributed or even unrelated content servers. Further, content may not be limited to merely maps. For example, if a user is visiting a tourist attraction, the caching module 108 may seek content from a server identified as providing point of interest content related to the particular location or attraction. A museum, for example, may provide multimedia content that can be presented on the mobile device 102 for a user touring the museum. Exemplary content may include an audio narrative guided tour or descriptive information about the exhibits. As described with respect to maps, this contextual content may be downloaded and cached on an as-needed basis to accommodate memory or other limitations. The location-based caching system may support the download and presentation of any data type in conjunction with a location-aware framework as further described herein in order to provide appropriate contextual content. The data can be provided also to any other application on the mobile device 102 for presentation, positional calculation, or any other supported purpose.

The caching module 108 may make content storage and presentation determinations based upon memory allocation, processor demand, and other state information of the mobile device 102 at any given time. For example, if the memory available on a mobile device 102 is insufficient to store the requisite maps for an entire planned route, the location-based caching system 100 is able to dynamically provide the user with appropriate maps for the entire trip by discarding prior map segments from the memory and downloading future map segments as necessary. The location-based caching system 100 thereby provides a significant advantage over other technologies that download and statically store maps based upon a predefined route in advance of a trip. The caching module 108 may also take into account the size and resolution of the particular display for the mobile device 102 and present higher resolution content to a mobile device 102 that can support it.

The connection manager 114 may also use the user preference information in the context container 112 as well as state information of the mobile device 102 to make connection decisions. For example, based upon a data plan associated with a user's mobile device 102, different pricing structures may apply to data transfer via one service or protocol at different times of the day. Alternately, a user may subscribe to a flat rate WiFi service from a particular provider. If the user is in a particular location serviced by multiple WiFi providers, the connection manager 114 would select the user's subscription service as opposed to another available service. In yet another example, if the connection manager 114 recognizes that the mobile device 102 is docked or otherwise connected to a wired network, the connection manager 114 may choose to use such a wired network for data transfer over a wireless option because of higher data transfer speeds.

Figure 2:
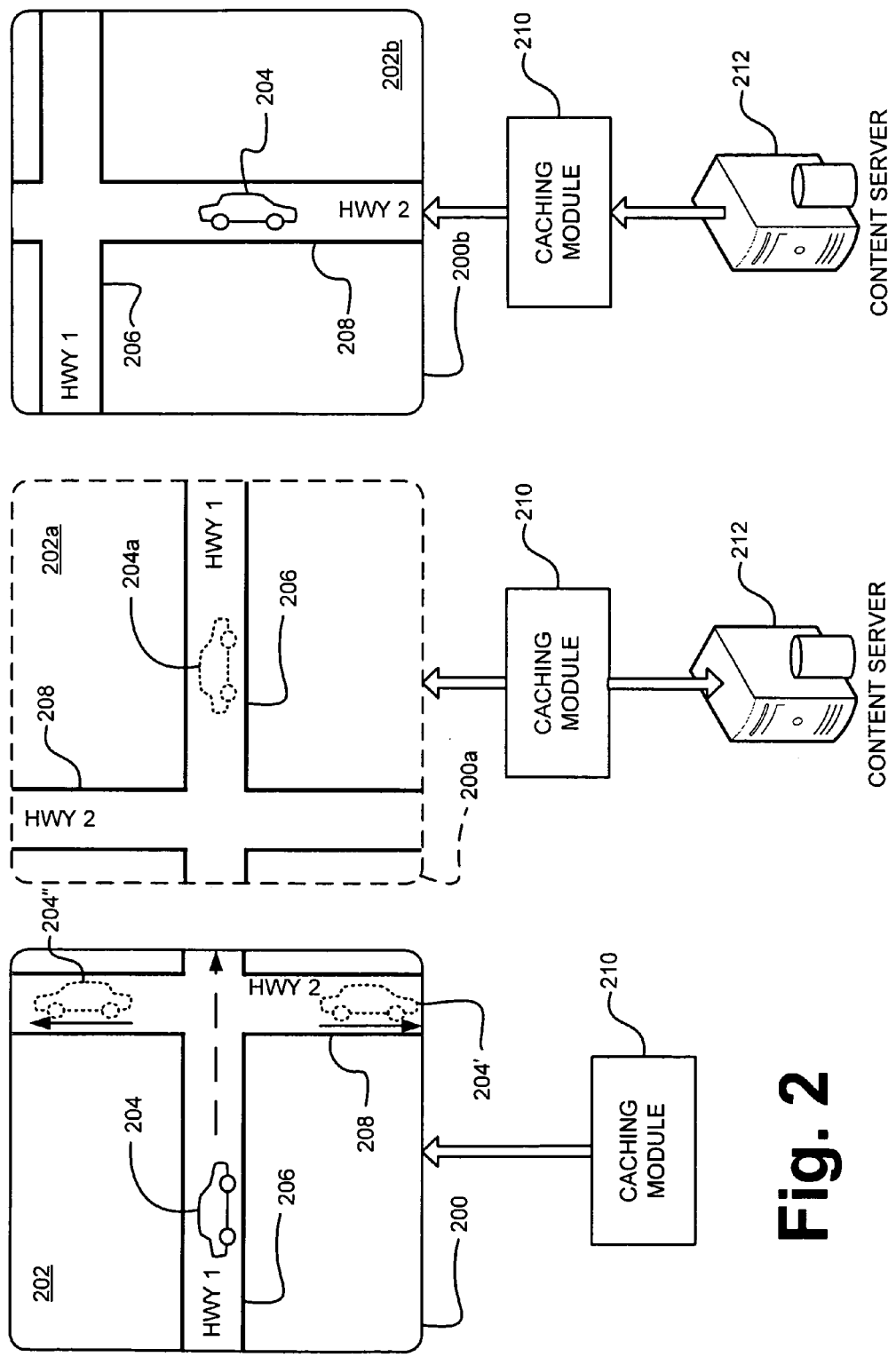
FIG. 2 is a schematic diagram of an exemplary location-based caching operation on a mobile device.

A simple, exemplary implementation of the location-based caching system for a mobile device is depicted in FIG. 2. In a first time period, a mobile device display 200 depicts a first map 202 indicating the position of a user in the context of the geography indicated by the first map 202. The first map 202 is provided to the display 200 by the caching module 210. The user is depicted as travelling in a car 204 along a first highway 206 toward an intersection with a second highway 208.

Based upon prior environmental and other contextual information, for example, the length of travel time of the car 204 on the first highway 206, prior trips by the user on the first highway 206, and other considerations, the caching module 210 had anticipated that the user would continue to travel down the first highway 206 past the intersection with the second highway 208. Thus, the caching module 210 had previously stored a second map 202a as shown in the proposed display 200a for a second time period. The second map 202a estimates the position of the user's car 204a along the first highway 206 past the intersection with the second highway 208.

However, the location manager and moving direction estimator provide updated information to the caching module 210 indicating that the user is slowing down. From the positional and contextual information of the first map 202, the caching module 210 may determine that there is a potential that the user may turn onto the second highway 208 as indicated in the first map 202 by the alternate positions of the car 204', 204" on the second highway 208. Therefore, instead of displaying the second map 202a, the caching module 210 contacts the content server 212 to retrieve additional maps to cover the possibility that the user may turn onto the second highway 208.

Once the location manager determines that user has turned a particular direction, the caching module 210 presents the appropriate third map 202b in the display 200b showing the car 204 proceeding down the second highway 204 and showing the geography in the direction of the second highway 208. As indicated in with respect to the third map 202b of the display 202b, the third map 202b was dynamically downloaded by the caching module 210 from the content server 212.

Figure 3:
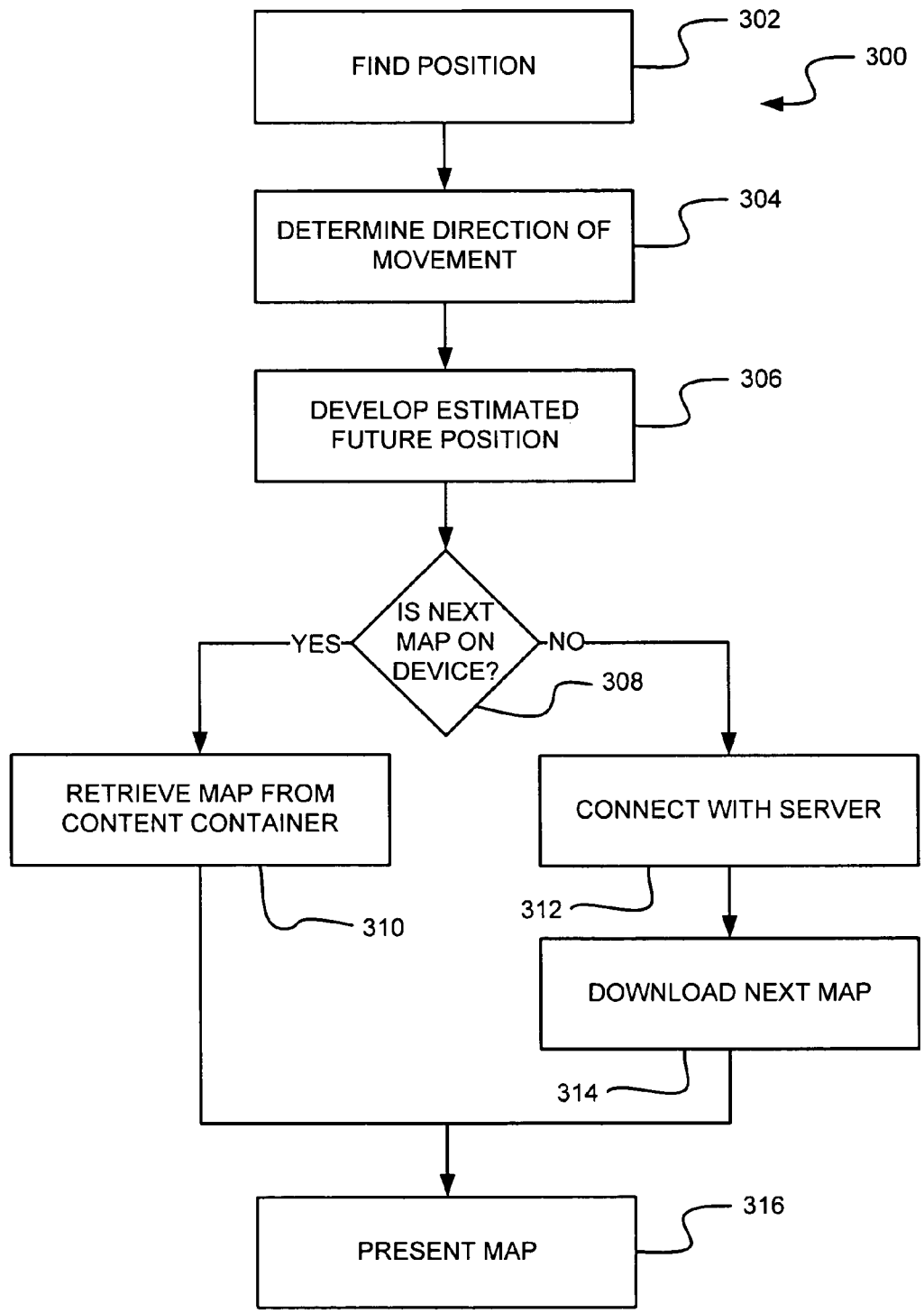
FIG. 3 is a flow diagram of a series of operations performed by a location-based caching system to dynamically provide content to a mobile device.

FIG. 3 depicts a series of exemplary operations 300 performed by the location manager module 104, the moving direction estimator module 106, and the caching module 108 of FIG. 1 to provide the location-based caching functionality on the mobile device 102. In a finding operation 302, the location manager 104 determines the geographic position of the mobile device 102. As previously described, this finding operation 302 may be performed through GPS or other triangulation methodologies or may simply be based upon user input. Next, in a determination operation 302, the moving direction estimator 106 determines the direction of movement of the mobile device 102. Then in a development operation 306, the caching module 108 develops an estimated future position of the mobile device 102. As previously described, this development operation 306 may take into account additional contextual factors such as the particular environment of the mobile device 102 and user preferences stored in the context container 112.

Based upon the positional, directional, and contextual information, the caching module 108 undertakes a query operation 308 to determine whether an appropriate next map is already stored on the mobile device 102. If there is already an appropriate map, in a retrieving operation 310 the caching module 108 retrieves the next map from the content container 110. Alternately, if in the query operation 308, the caching module 108 determines that the next appropriate map is not already stored on the mobile device 102, in a connecting operation 312 the caching module 108 connects with the content server 124 via the network 122. Then in a downloading operation 314 the caching module 108 downloads the next appropriate map from the content server 124. Once the caching module 108 has either retrieved the next map from the content container 110 or downloaded the map from the content server 124, in a presenting operation 316, the next appropriate map is presented to the user via a display on the mobile device 316.

Figure 4:
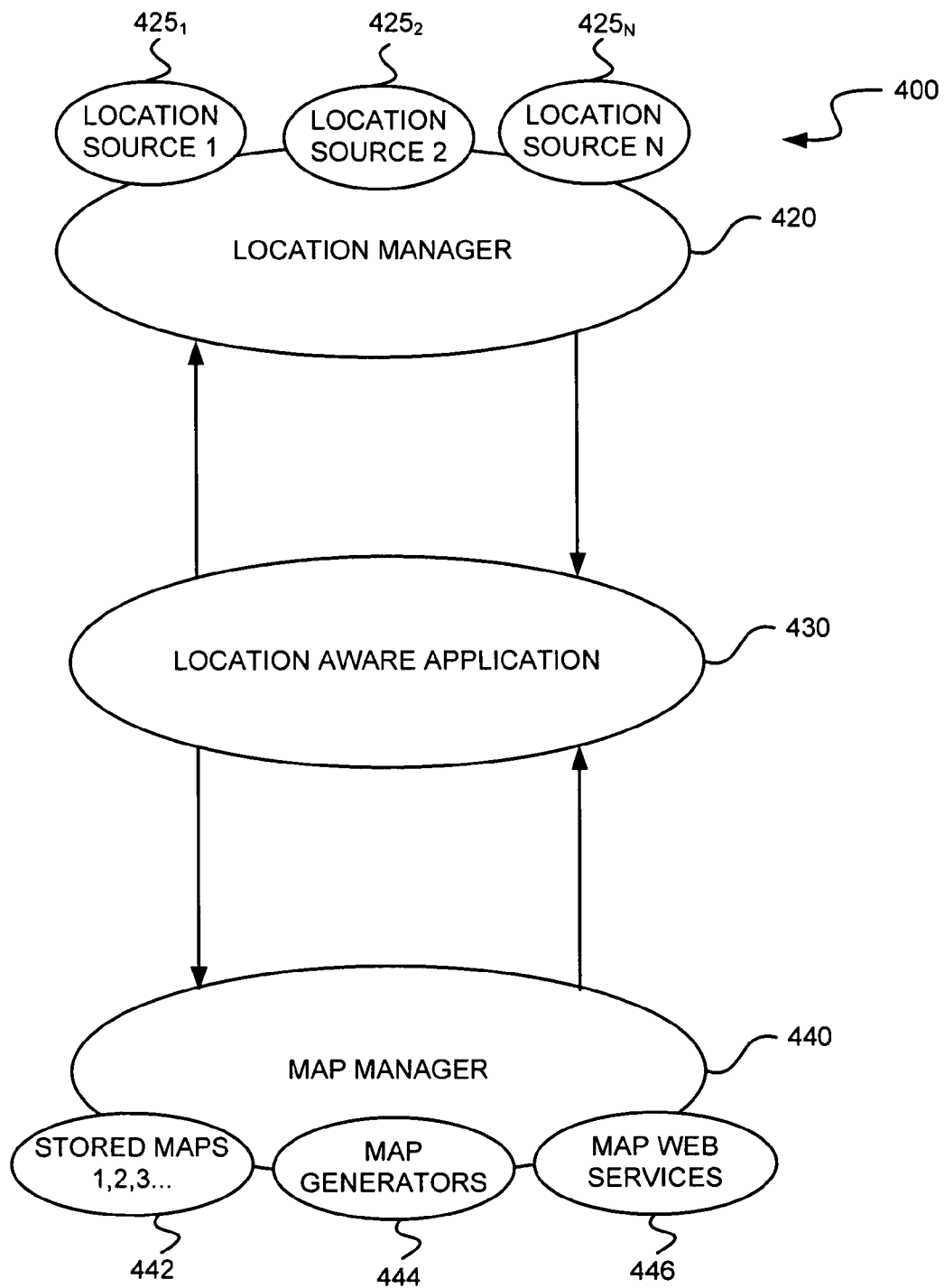
FIG. 4 is a schematic diagram of a location-aware system that provides content within a location-based caching system.

FIG. 4 illustrates a location-aware system 400 that may be implemented as part of the location-based caching system to provide appropriate maps for the mobile device. The location aware system 400 includes a location manager 420, a location-aware application 430, and a map manager 440. The location manager 420 is connected with one or more location sources $425_{(1-N)}$. The map manager 440 is connected with one or more map stores 442, map generators 444, and map web services 446.

The location manager 420 is configured to receive location information from the one or more mobile device location sources $425_{(1-N)}$ and abstract the location information into location events that are provided to the location-aware application 430. The mobile device location sources $425_{(1-N)}$ may be anything that provides location information about an item. For example, one mobile device location source may be a GPS receiver. Another mobile device location source may be a user input that indicates the position of the user. For example, a user may indicate through a user input on a mobile device that the user is at a certain location. The user may enter a location into the mobile device through a user interface, for example, a keypad, a touch screen, or voice recognition. Another mobile device location source may be an RFID tag. Each mobile device location source $425_{(1-N)}$ may provide different resolutions of location data. For example, some location sources may be very accurate while other location sources may only be accurate to within a defined area, for example, a neighborhood or a stretch of a road.

A mobile device location source $425_{(1-N)}$ can correspond to a proximate or distant location source. A proximate source corresponds to location generating hardware, including, but not limited to, a GPS receiver or to the mobile device itself which determines its location from network information. A distant location source corresponds to location information either pushed or pulled from a remote networked source (e.g., a pushed Short Message Service (SMS) message arriving with the location of a car, or location information returned (pulled) via a web request). Both the proximate and distant location sources are treated as abstract logical entities. This makes the programming model similar for many different kinds of location information.

Once the location data is received, the location manager 420 determines if any location event is triggered that relates to the location-aware application 430. Instead of merely providing raw location data from the location sources to the location-aware application 430, the location manager 420 provides location events upon the occurrence of an item having some logical relationship with an area of interest, such as entering or leaving the area of interest. An area if interest may relate to any area and can be indoors or outdoors. For example, an indoor location could be used to show the location of a fixed asset (e.g., a conference room) and/or moveable asset (e.g., people, office equipment, or inventory). An outdoor area of interest could be a city block, an area around a building or some other landmark, or some other predefined area. An outdoor area of interest may also be a movable asset (e.g., a car or a person).

Rather than interpreting the raw location data, the location-aware application 430 registers location events based on the relation of the item to areas of interest. Upon the occurrence of a predefined location event, the location manager 420 notifies the location-aware application 430. At that point, the location-aware application 430 executes an event driven code routine developed to handle the location event. The location-aware application 430 thus responds to the generated location events.

Upon the occurrence of a location event, the location-aware application 430 supplies a set of weighted criteria to the map manager 440. For example, the weighted criteria may include a suggested map resolution along with a set of objects that the location-aware application 430 would like displayed on the map drawn by the map generators 444. The location-aware application 430 may also supply objects that the location-aware application 430 wants rendered on top of an existing or generated map. In addition to the location-aware application 430 responding to events to drive the rendering of maps by the map manager 440, the location-aware application 430 can also be self driven. For example, the location-aware application 430 may have a timer that periodically "pulls" information and requests the rendering of a new map by the map manager 440. So in addition to "push" event-driven responses, the location-aware application 430 can also "pull" data and take action.

The map manager 440 abstracts the map information from the location-aware application 430 such that it does not need to know details regarding how to handle maps or location information. Instead of the location-aware application 430 having to include complex map rendering code, the location-aware application 430 provides the map manager 440 with the name or type of map it would like displayed. The map generators 444 are not tied to any single application, or rendering engine. For example, one rendering engine may be vector based, whereas another rendering engine may be bitmap based. The map manager 440 thus provides the location-aware application 430 with an interface to interact with the map generator 444.

The map manager 440 provides a rich set of features to the location-aware application 430 without the location-aware application 430 having to know the details of how to implement the map code. For example, suppose application 430 wants to allow a user to point to an area on a map and then have that data translated to a latitude and longitude, or in the case of an indoor map into indoor coordinate systems. The map manager 440 provides that information to the location-aware application 430. The map manager 440 acts as a broker between the location-aware application 430 and the map generators 444 and map web services 446 and supplies functionality to the location-aware application 430.

Some of the functionality includes mapping X/Y screen coordinates on the mobile device to latitude/longitude/altitude map coordinates on the map. For example, a user may click on the screen that is currently displaying a map to input their location. In response to the user input, the map manager 440 maps the X/Y screen location to the latitude/longitude/altitude map location. Similarly, the map manager 440 maps latitude/longitude/altitude map data to X/Y screen locations allowing the location-aware application 430 to dynamically render on top of the currently displayed map. The altitude on some map renderings, such as a ski-area map, may significantly affect the X/Y location.

There are many ways of converting an X/Y coordinate into a latitude/longitude/altitude coordinate. Generally, the map manager 440 receives the X/Y screen coordinate, matches the coordinate to a map, and then, based on the scale of the map and map boundaries, use of projection technology provides the latitude/longitude/altitude coordinate. The location-aware application 430 does not need to understand how the maps themselves are rendered or what "projection technology" is used. Many different map projection technologies are possible, including, but not limited to, classical map projection techniques such as Mercator projections, cylindrical projections, polar projections, grid projections, and custom projection technologies (e.g., a ski-area map or a stadium seating map). The location-aware application 430 may seamlessly move between different projection techniques.

The map manager 440 also supplies high level events about the set of available maps to the location-aware application 430. These events provide the location-aware application 430 important information such as when several maps are available that meet the criteria requested by the location-aware application 430. The location-aware application 430 is not confined to using a single map for display. For example, one application may use a street map for one period of time and then use a metro map (e.g., showing bus routes, subway tunnels, etc.) during another time. The map manager 440 ranks the maps according to their order of suitability. When there are no maps available that meet the criteria provided by the location-aware application 430, but the map manager 440 may locate maps that meet some of the criteria, then those maps may be provided.

The map manager 440 also allows for the dynamic provisioning of new maps onto the mobile device. The maps may be downloaded to the mobile device at any time. For example, a new map may be downloaded for a public transportation application when a new transit route is added. According to one embodiment, these maps are represented using two files, one binary and opaque to the map manager 440 and one that it understands. According to one embodiment, the map is represented using an XML file. The map manager 440 is able to read the XML file and obtain the information necessary to add the map to the local map data store on the mobile device.

The following is an exemplary XML representation of a map file.

```
<MapData Version="1.01" MapProjection="SimpleGrid"
MetersPerPixel="2.80253449893166" MapInfoClass="none"
CustomMapRender="none">
    <SimpleLatLongRectangle
    MapFileName="device_map_1_0.PNG">
        <MapCoordinate Position="NorthWestCorner"
        Latitude="50.7867"
        Longitude="6.07814549019608" />
        <MapCoordinate Position="NorthEastCorner"
        Latitude="50.7867"
        Longitude="6.09407106666667" />
        <MapCoordinate Position="SouthWestCorner"
        Latitude="50.7766295454545"
        Longitude="6.07814726827094" />
        <MapCoordinate Position="SouthEastCorner"
        Latitude="50.7766295454545"
        Longitude="6.09406985757576" />
    </SimpleLatLonRectangle>
</MapData>
```

MAPPROJECTION refers to the technology that is used to display the map. In this particular example, the map projection type is a simple grid. METERSPERPIXEL refers to the average resolution of the map. MapInfoClass refers to whether there is a custom class that is needed to answer questions about this map. This field allows a developer to include a custom class within the programming environment that may be called when this map is displayed. Similarly, CUSTOMMAPRENDERER refers to whether a custom rendering engine is needed to draw the map. The MAPFILENAME field refers to the binary file name that contains information that the map-rendering engine that will be used to draw the map. The SIMPLELATLONGRECTANGLE field identifies the map as a rectangle defined by latitude and longitude coordinates.

The following example illustrates some of the custom fields being utilized.

```
<MapData Version="1.01" MapProjection="SimpleGrid"
MetersPerPixel="2.80253449893166" MapInfoClass="CustomMapInfo1"
CustomMapRender="CustomMapRender1">
    <CustomMapInfo1 MapFileName="device_map_1_0.PNG"
    classid="CustomMapEngine.MapInfoParser" />
    <CustomMapRender1 MapFileName="device_map_1_0.PNG"
    classid="CustomMapEngine.MapRenderEngine" />
</MapData>
```

The map manager 440 may have multiple maps available on the device in a map store 442 that may be used by application 430. Map manager 440 searches though the set of maps available on the device in map store 442 and looks for the best map to be used. After being selected, the best fit map is selected and rendered.

Figure 5:
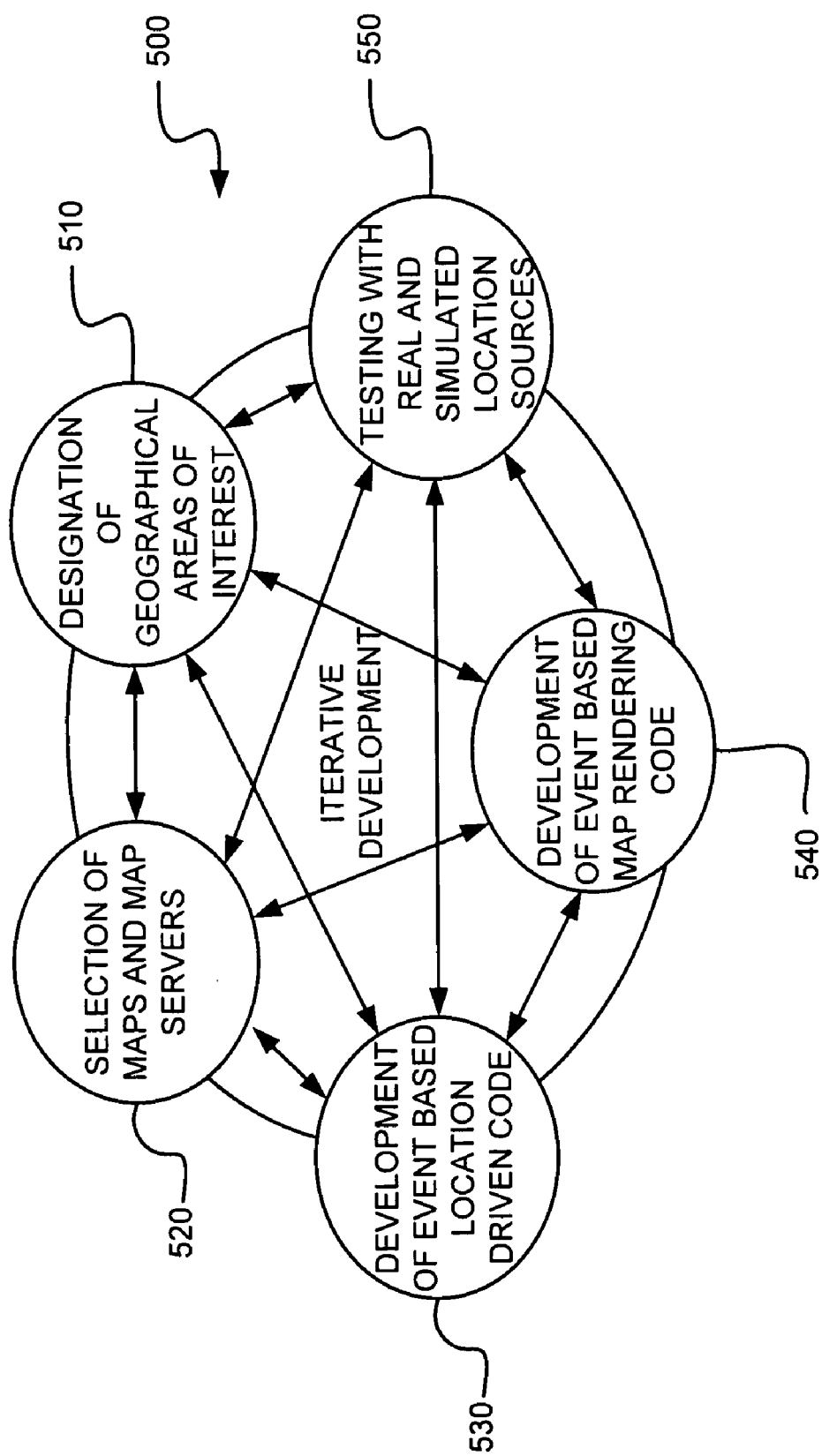
FIG. 5 is a schematic state diagram of interactions in the development of location-aware applications.

FIG. 5 depicts a state diagram 500 of interaction for development of location-aware applications. Starting at state 510, geographical areas of interest are defined. The selection of the areas of interest may occur before or after the location-aware application is deployed. Additionally, this information may be sent out to the mobile devices at any time. An area of interest is a predefined region that relates to a map. The area of interest may be any size that is definable. For example, an area of interest may be the size a square meter or an entire country. The areas of interest are defined based on the needs of the location-aware application.

For example, suppose the location-aware application being developed determines when a child leaves school and returns home. In this particular example, areas of interest may be an area including the school and another area including the child's home. Some areas of interest may be selected by the developer, while other areas of interest may be selected by a user. For example, many location-aware applications, such as the example described above, are configured after the location-aware application is provided to the user. In the above example, a parent may select the areas of interest.

State 520 shows the selection of maps and map servers. A developer may select between the maps available in the system or may create its own maps. According to one embodiment of the invention, the available maps are shared across location-aware applications such that different location-aware applications may use the same map. In this way, each location-aware application does not need to develop its own maps. In most instances, the specifics of the map rendering are hidden from the developer of the location-aware application. Should the developer desire to include its own rendering software, the developer may incorporate the rendering software into the environment at state 540 as further described below.

At state 530, the developer programs the event based location code that is executed in response to events associated with the areas of interest within the location-aware application. This event based code is dependent upon the type of location-aware application being developed and may include many different types of data. For example, a program may perform an action when a user reaches a predetermined location. In the tracking the child example above, an example routine may be programmed to highlight the home or school based on the location of the child at that particular time. The developer may also place items onto the map in response to the events.

At state 540, the developer may also set up a preference for map rendering. For example, the developer may want to use a vector-based rendering engine for one part of the application and a bitmap-based system for another part of the application. The map engines may be provided by many different sources. Any developer who wants to build an engine may supply a map engine that conforms to the programming interface. Each map engine is plugged into the development system.

At state 550, the location-aware application may be tested using real and/or simulated location sources. The system provides a simulator of a location source such that the location-aware application may be tested before it is put to us in the field. Using a simulated data source provides a developer event-based location code to be tested upon the occurrence of a location event. Another use of a simulated location-source data is to "play back" previously-recorded, real-world location data. This is useful for application development, testing, and debugging.

Figure 6:
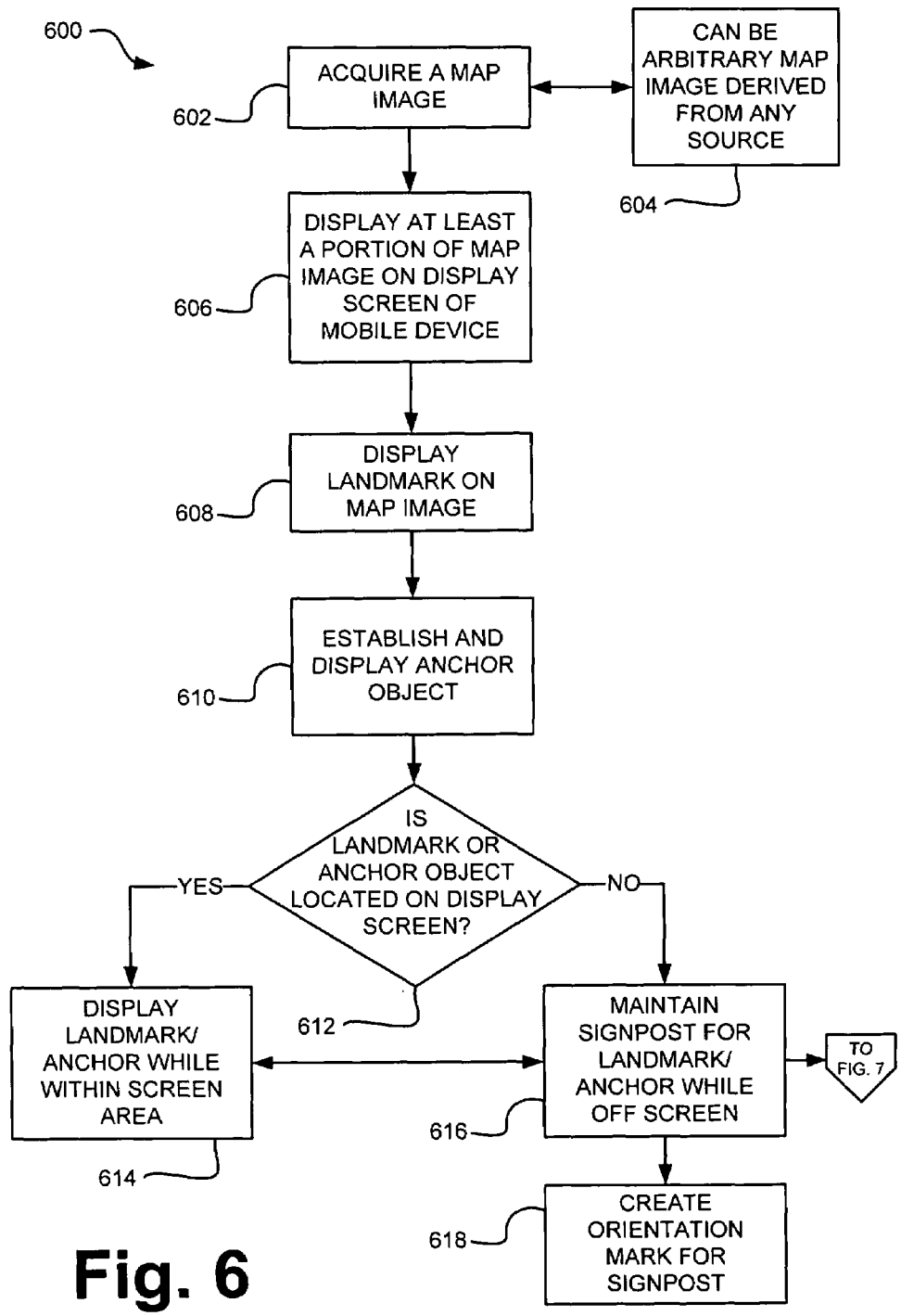
FIG. 6 is a flow diagram of signposting and orientation operations that provide content within a location-based caching system.

FIG. 6 presents a flow diagram that shows an exemplary implementation of a location-aware framework 600 for selecting maps or other location-based content. Initially, at acquiring operation 602 a map image is acquired. Operation 604 indicates that the map image may be any arbitrary image acquired from any source. For example, the map image may be obtained from a pre-stored source (e.g., the caching module 108 of FIG. 1) in the mobile device that displays the image, or from an outside source, whether an external memory device or by downloading the map image from a map source (e.g., the content server 124 of FIG. 1) or even from another user. The map image may also be dynamically rendered by a rendering image before downloading to the mobile device. The maps that are displayed on the mobile device may have various resolutions and be stored in various formats. As long as signposting and orientation information can be superimposed on the map image, any arbitrary map is acceptable.

At displaying operation 606, at least a portion of the acquired or dynamically rendered map image is displayed on the mobile device. Since mobile devices, such as cell phones, pagers, or personal digital assistants, typically have small display screens, the entire map image may not be able to be displayed. In some instances, if the display is large enough or the map small enough, the entire map image or a substantial portion thereof may be displayed. In the event that only a portion of the map is able to be displayed, it may be desirable to superimpose additional navigational items, for example, directional information or landmarks (hereinafter "landmarks"), on the map image. Alternatively, such landmarks may be displayed in conjunction with any map regardless of size, resolution, or comprehensiveness.

In a second displaying operation 608, such landmarks are in fact displayed on the map image. In one implementation, landmarks may be superimposed on the map image, such that the relation of the signposts to the surrounding geography can be seen. Multiple landmarks, either stationary or mobile about the map image, can be displayed. In another implementation, one landmark may be considered an anchor or object of reference with respect to other landmarks on the map image.

In establishing operation 610, once a landmark is displayed, an object of reference to anchor that landmark may be established. Alternately, the anchor object could be established first and then the landmark could be displayed (i.e., operations 608 and 610 could switch temporal order). The anchor object can be located anywhere on the map image, either on or off the display screen. Alternatively, if the anchor object moves off the display screen, for example, in the event the user changes location or changes the resolution of the display, a new anchor object within the map area on the display screen may be chosen. Anchoring the landmark to the anchor object allows certain relationships to be maintained between the landmark and the anchor object. For example, a distance relationship and a directional relationship between an anchor object and a landmark may be determined.

The anchoring relationship may be maintained even though landmarks and the anchor object itself move about, disappear from, or reappear on the display screen. For example, the anchor object may initially be displayed in the center of the map image with other landmarks surrounding the anchor object. Any land mark at a location on the map image that does not fit within the display dimensions may be referenced by a signpost within the display dimensions indicating the relative location of the landmark on the unseen portion of the map image. The signposts function to remedy the problem of maintaining a map at a certain level of particularity while maintaining information regarding relationships about items that are unable to fit on a display at that level of particularity.

Once the anchor object is in place, a determination is made in query operation 612 whether the landmark or anchor object is on the display screen of the mobile device. If the answer to the query operation 612 is "yes," namely, that the anchor object or landmark does indeed fit within the display screen area, then the anchor object or landmark is displayed on screen in display operation 614. The anchor object and the landmarks are displayed as long as the location of the anchor object or a particular landmark remains within the area of the map image on the display screen. Note that a user of a mobile device may change the displayed map image area by either zooming in or zooming out of a map image or by moving from one physical location to another. For example, suppose a user is viewing a map image and decides to zoom in on a particular portion of the map away from where a landmark is displayed. If the user zooms in enough, the landmark will no longer fit onto the display (i.e., the landmark will still be located on the map image itself, but may no longer be displayable of a mobile device screen).

Note that the larger the resolution of a map image created as the user of the mobile device zooms in on the map image, the more likely additional signposts will appear. Also, if the location of the anchor object is off the screen, a signpost may be used to point to the anchor object as well. In these scenarios, a maintaining operation 616 maintains a signpost for the landmark or anchor object so long as it is out side the viewable area of the display screen. Signposting is either turned on or off depending whether the landmark or anchor object is displayable for not. Thus, the location-aware framework 600 alternates states between operations 614 and 616 as indicated in FIG. 6 as the resolution of the map image or the location or the location of the user changes.

Moreover, when the framework 600 is at maintaining operation 616, an optional creation operation 618 may be implemented. In the creation operation 618, an orientation mark is created to indicate to the user the direction, distance and/or other information about the landmarks represented by signposts. An orientation mark may be created either automatically, upon request of the user, or upon some other condition. The orientation mark may include corresponding direction vectors to help a user orientate himself with respect to the map image.

Figure 7:
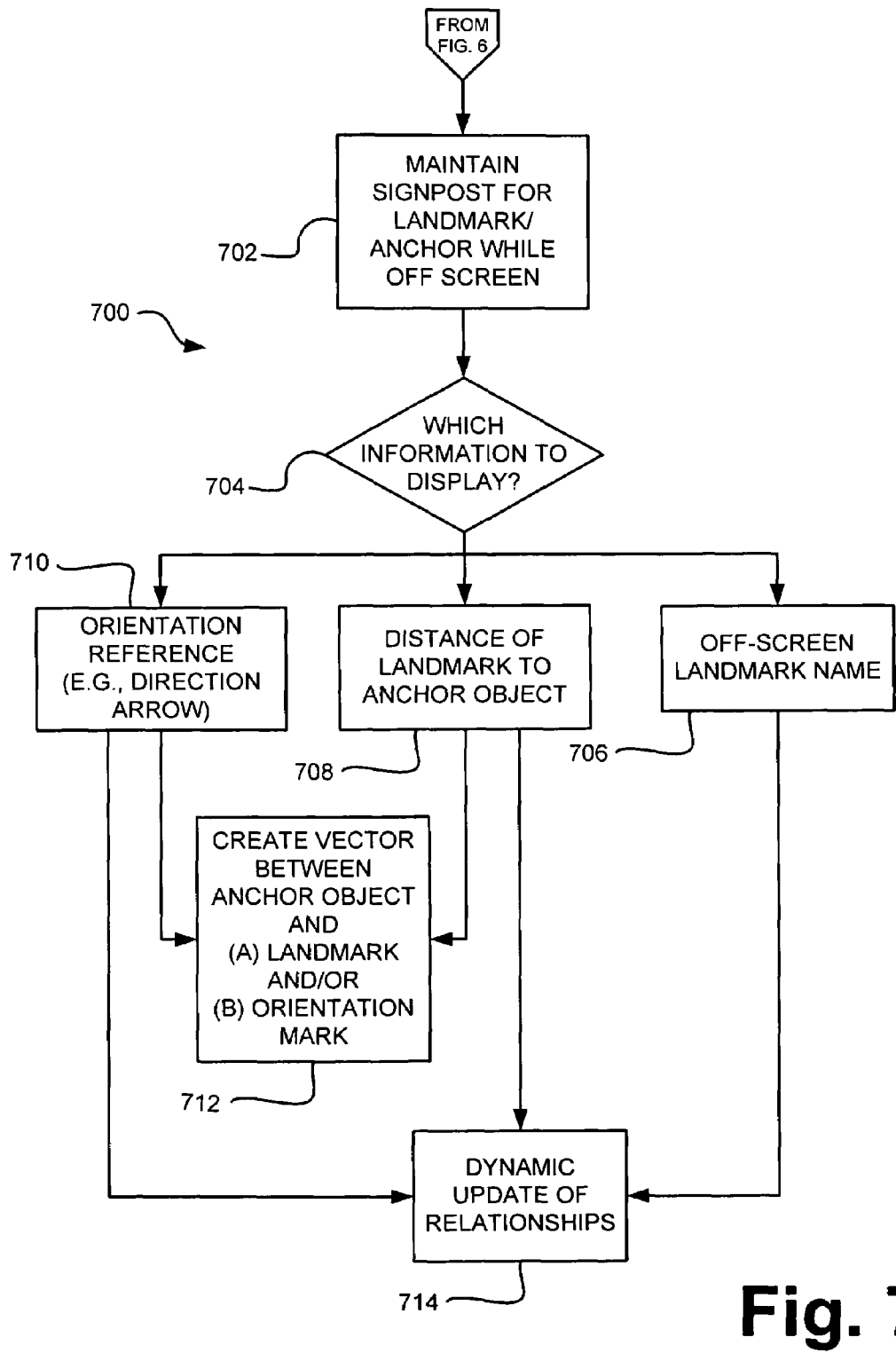
FIG. 7 is a flow diagram of signposting and orientation operations providing additional detail to FIG. 6.

FIG. 7 provides additional detail concerning maintain operation 616 of FIG. 6 above, which is renumbered operation 702 in FIG. 7. In a query operation 704, a decision is made as to what of several possible types of available information is to be displayed as part of the signpost.

A first possibility is indicated at operation 706, wherein the name of the off-screen landmark is displayed as the signpost.

A name is merely exemplary, and other identifying symbols could be used instead, for example, numbers or graphical icons. A second possibility depicted in operation 708 is to indicate the distance of the landmark to the anchor object. Other relationships could also be displayed, such as a temporal relationship between the anchor object and the landmark. A third possibility depicted in operation 710 is to develop an orientation reference. The orientation reference may be used to point in the direction with respect to the anchor object the user must move in order to reach the landmark. The orientation reference need not point exactly toward the landmark, i.e., as would a vector, but can point substantially in the appropriate direction.

Alternatively, for a more accurate depiction, an orientation mark with vectors to landmarks could be provided. Creation of a directional vector between an anchor object and a landmark is indicated in creation operation 712. A directional vector may also be provided that allows a user to use the vector to align himself with respect to an orientation mark not associated with the map image, for example, the position of the sun. A directional vector can also be used to help clarify special relationships between signposted landmarks, orientation marks, and anchor objects.

Finally, in updating operation 714, any of the relationships displayable in signposts can be dynamically updated. Thus, landmarks could change names if, for example, one landmark corresponds to a user of a mobile device who then gives that mobile device to a second user who will be tracked via the mobile device. Certainly orientation references, vector or otherwise, and distance calculations need to be updated as the user of the mobile device moves about the area defined by the map image.

Figure 8:
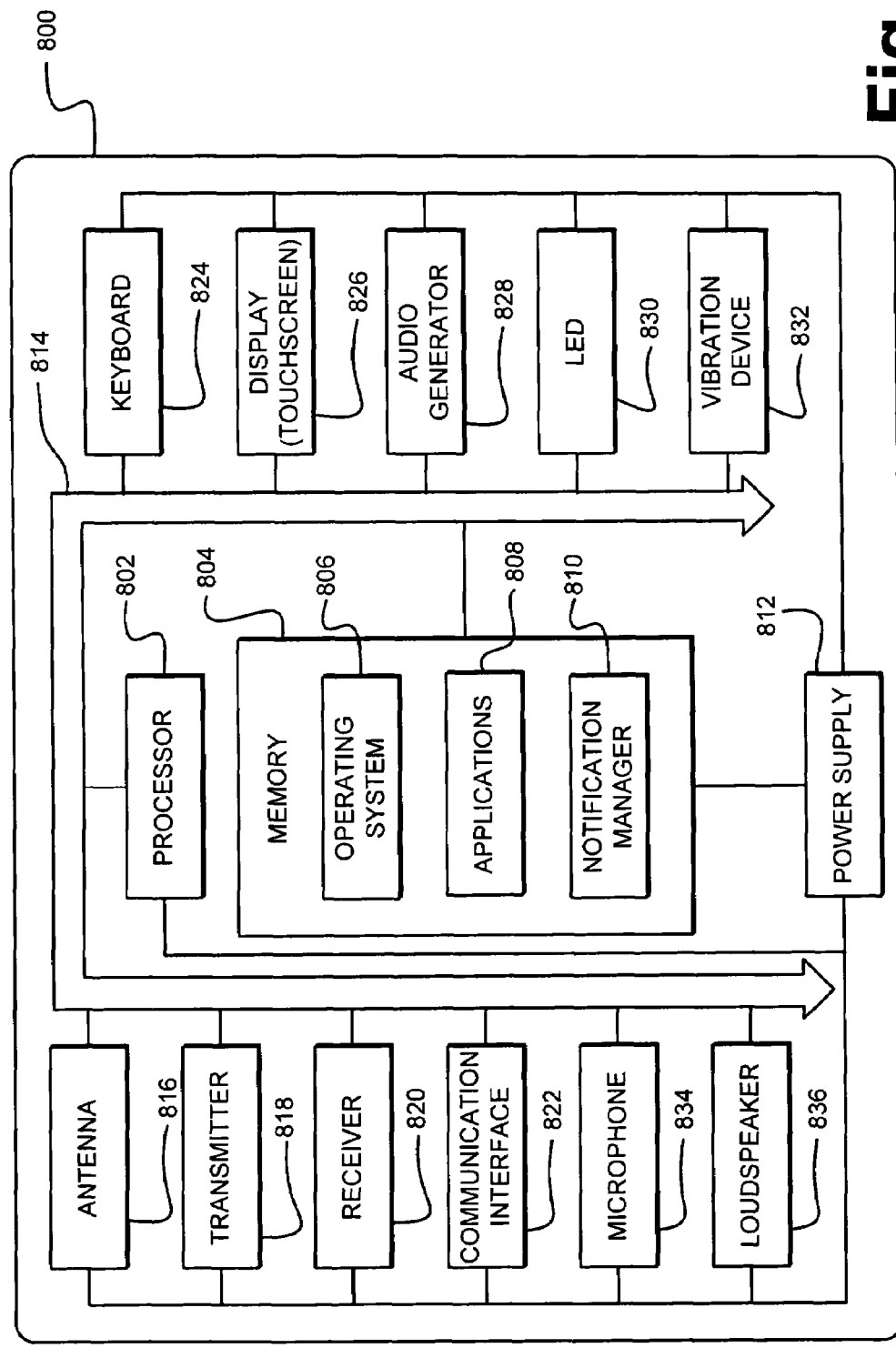
FIG. 8 is a schematic diagram of a general purpose mobile device that may be used in the implementation of a location-based caching system.

An exemplary mobile device 800 for use within the location-based caching system is depicted in FIG. 8. The mobile device 800 includes a processor 802 and memory 804 as in any standard computing device. The processor 802, memory 804, and other components hereinafter described may interface via a system bus 814. The system bus 814 may be any of several types of bus structures including a memory bus or memory controller, a peripheral bus, a switched fabric, point-to-point connections, and a local bus. The memory 804 generally includes both volatile memory (e.g., RAM) and non-volatile memory (e.g., ROM or a PCMCIA card). An operating system 806 may reside in the memory 804 and execute on the processor 802. An exemplary operating system may be the WINDOWS CE operating system form Microsoft Corporation.

One or more application programs 806 may be loaded into the memory 804 for execution by the processor 802 in conjunction with the operating system 806. Exemplary applications may include electronic mail programs, scheduling programs, personal information management programs, word processing programs, spreadsheet programs, Internet browser programs, music file management programs, and photograph and video file management programs. The memory 804 may further include a notification manager 810, which executes on the processor 802. The notification manager 810 handles notification requests from the applications 808 to one or more user notification devices as described in greater detail below.

The mobile device 800 also has a power supply 812, which may be implemented using one or more batteries. The power supply 812 may also be from an external AC source through the use of a power cord or a powered data transfer cable connected with the mobile device 800 that overrides or recharges the batteries. The power supply 812 is connected to most, if not all, of the components of the mobile device 800 in order for each of the components to operate.

In one embodiment, the mobile device 800 may include communications capabilities, for example, the mobile device 800 operates as a wireless telephone. A wireless device 800 with telephone capabilities generally includes an antenna 816, a transmitter 818, and a receiver 820 for interfacing with a wireless telephony network. Additionally, the mobile device 800 may include a microphone 834 and loudspeaker 836 in order for a user to telephonically communicate. The loudspeaker 836 may also be in the form of a wired or wireless output port for connection with a wired or wireless earphone or headphone.

The mobile device 800 may connect with numerous other networks, for example, a wireless LAN (WiFi) network, a wired LAN or WAN, GPRS, Bluetooth, UMTS or any other network via one or more communication interfaces 822. The antenna 816 or multiple antennae may be used for different communication purposes, for example, radio frequency identification (RFID), microwave transmissions and receptions, WiFi transmissions and receptions, and Bluetooth transmissions and receptions.

The mobile device 800 further generally includes some type of user interface. As shown in FIG. 8, the mobile device 800 may have a keyboard 824 and a display 826. The keyboard 824 may be a limited numeric pad, a full "qwerty" keyboard, or a combination of both. The keyboard 824 may also include specialty buttons, wheels, track balls, and other interface options, for example, menu selection or navigation keys or telephone function keys. In addition to depicting information, the display 826 may also be a touch screen display that allows for data entry by touching the display screen with the user's finger or a stylus to make input selections via a graphical interface or write letters and numbers directly on the display 826.

The mobile device 800 may also have one or more external notification mechanisms. In the embodiment depicted in FIG. 8, the mobile device 800 includes an audio generator 828, a light emitting diode (LED) 830, and a vibration device 832. These devices may be directly coupled to the power supply 812 so that when activated, they may remain energized for a duration dictated by the notification manager 810, even though the processor 802 and other components may shut down to conserve battery power.

Figure 9:
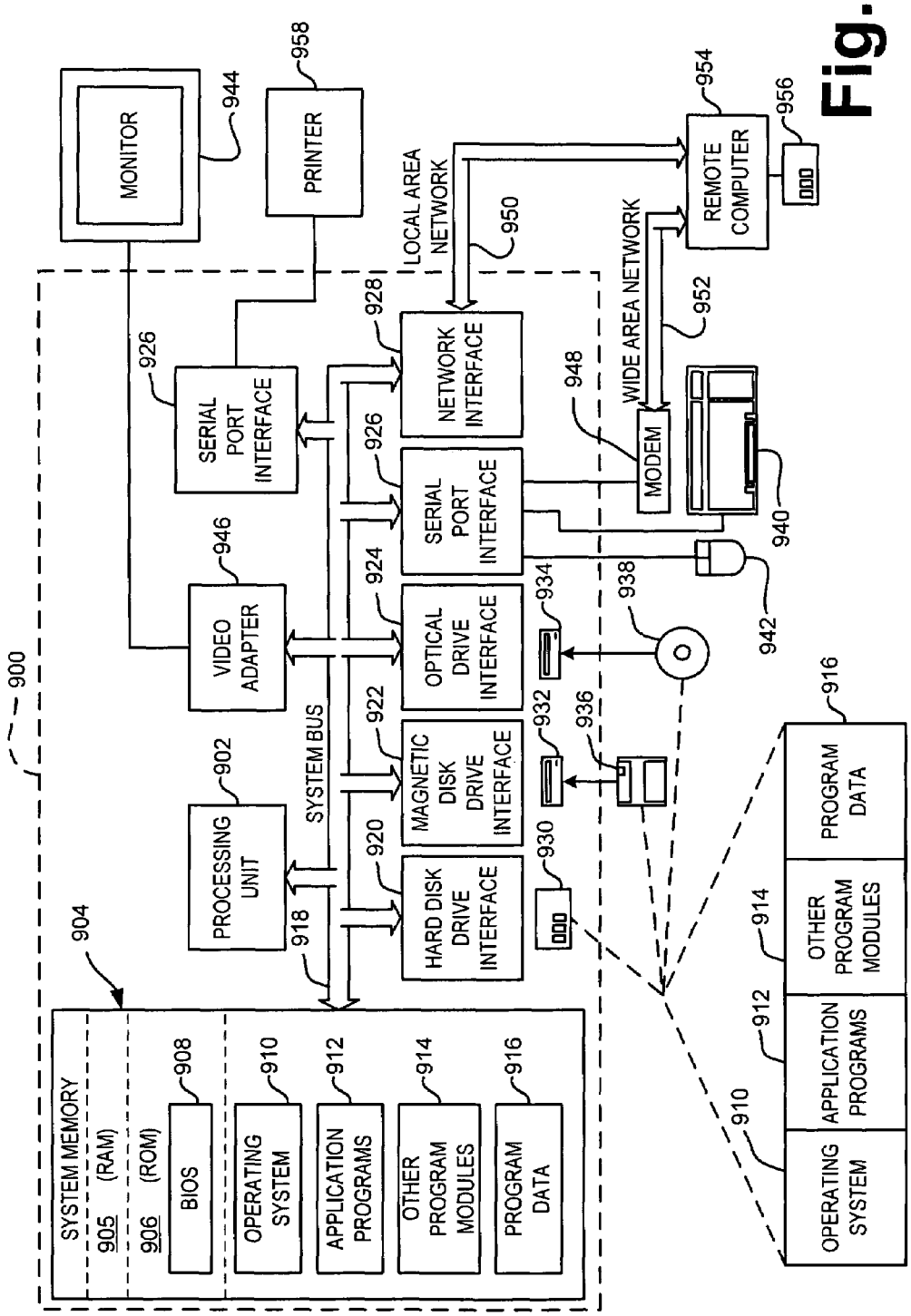
FIG. 9 is a schematic diagram of a general purpose computer system that may be used in the implementation of a location-based caching system.

Exemplary hardware and an operating environment that may be used as the content server is depicted in FIG. 9. This hardware includes a general purpose computing device in the form of a computer 900, including a processing unit 902, a system memory 904, and a system bus 918 that operatively couples various system components, including the system memory 904 to the processing unit 902. There may be only one or there may be more than one processing unit 902, such that the processor of computer 900 comprises a single central processing unit (CPU), or a plurality of processing units, commonly referred to as a parallel processing environment. The computer 900 may be a conventional computer, a distributed computer, or any other type of computer; the invention is not so limited.

The system bus 918 may be any of several types of bus structures including a memory bus or memory controller, a peripheral bus, a switched fabric, point-to-point connections, and a local bus using any of a variety of bus architectures. The system memory 904 may also be referred to as simply the memory, and includes read only memory (ROM) 906 and random access memory (RAM) 905. A basic input/output system (BIOS) 908, containing the basic routines that help to transfer information between elements within the computer 900, such as during start-up, is stored in ROM 906. The computer 900 may further include a hard disk drive 930 for reading from and writing to a hard disk, not shown, a magnetic disk drive 932 for reading from or writing to a removable magnetic disk 936, and an optical disk drive 934 for reading from or writing to a removable optical disk 938 such as a CD ROM or other optical media.

The hard disk drive 930, magnetic disk drive 932, and optical disk drive 934 are connected to the system bus 918 by a hard disk drive interface 920, a magnetic disk drive interface 922, and an optical disk drive interface 924, respectively. The drives and their associated computer-readable media provide nonvolatile storage of computer-readable instructions, data structures, program modules and other data for the computer 900. It should be appreciated by those skilled in the art that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 930, magnetic disk 932, optical disk 934, ROM 906, or RAM 905, including an operating system 910, one or more application programs 912, other program modules 914, and program data 916. In an exemplary implementation, the location awareness and map management operations may be incorporated as part of the operating system 910, application programs 912, or other program modules 914. State description files, object data values, and other data may be stored as program data 916.

A user may enter commands and information into the personal computer 900 through input devices such as a keyboard 940 and pointing device 942, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 902 through a serial port interface 926 that is coupled to the system bus 918, but may be connected by other interfaces, such as a parallel port, game port, or a universal serial bus (USB).

A monitor 944 or other type of display device is also connected to the system bus 918 via an interface, such as a video adapter 946. In addition to the monitor 944, computers typically include other peripheral output devices, such as a printer 958 and speakers (not shown). These and other output devices are often connected to the processing unit 902 through the serial port interface 926 that is coupled to the system bus 918, but may be connected by other interfaces, such as a parallel port, game port, or a universal serial bus (USB).

The computer 900 may operate in a networked environment using logical connections to one or more remote computers, such as remote computer 954. These logical connections may be achieved by a communication device coupled to or integral with the computer 900; the invention is not limited to a particular type of communications device. The remote computer 954 may be another computer, a server, a router, a network personal computer, a client, a peer device, or other common network node, and typically includes many or all of the elements described above relative to the computer 900, although only a memory storage device 956 has been illustrated in FIG. 9. The logical connections depicted in FIG. 9 include a local-area network (LAN) 950 and a wide-area network (WAN) 952. Such networking environments are commonplace in office networks, enterprise-wide computer networks, intranets, and the Internet, which are all types of networks.

When used in a LAN 950 environment, the computer 900 may be connected to the local network 950 through a network interface or adapter 928, which is one type of communications device. When used in a WAN 952 environment, the computer 900 typically includes a modem 948, a network adapter, or any other type of communications device for establishing communications over the wide area network 952. The modem 948, which may be internal or external, is connected to the system bus 918 via the serial port interface 926. In a networked environment, program modules depicted relative to the personal computer 900, or portions thereof, may be stored in a remote memory storage device. It is appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for providing location related content dynamically to a mobile communication device, the method comprising
   tracking a present location, speed, and direction of the mobile communication device;
   predicting a future location of the mobile communication device based upon current movement parameters, including the speed and direction, of the mobile communication device;
   identifying a suitable content type that accords in scale and context with the current movement parameters;
   determining whether content related to the future location and conforming to the identified suitable content type is presently stored in a cache on the mobile communication device;

retrieving the content from a content store via a network connection upon a determination that the content is not presently stored on the mobile communication device; and managing the cache by
   determining whether there is room in the cache to store the retrieved content;
   upon a determination that there is insufficient room in the cache to store the retrieved content, comparing content presently stored in the cache to the present location; deleting a portion of the content presently stored in the cache that is least related to the future location of the mobile communication device or the identified suitable content type; and storing the retrieved content in the cache.

2. The method of claim 1 further comprising presenting the content to a user via an interface of the mobile communication device.

3. The method of claim 2, wherein the interface comprises a visual display.

4. The method of claim 1, wherein the content comprises a map of an area containing the future location of the mobile communication device.

5. The method of claim 1 further comprising selecting the content based upon contextual information stored on the mobile communication device.

6. The method of claim 5, wherein the contextual information comprises preference information of a user of the mobile communication device.

7. The method of claim 5, wherein the contextual information comprises state information about the mobile communication device.

8. A computer-readable medium having computer-executable instructions for performing a computer process implementing the method of claim 1.

9. A location-based caching system comprising
a mobile communication device further comprising
   a location determination module that determines a present location, speed, and direction of the mobile communication device;
   a direction estimator module that estimates a future location of the mobile communication device based upon current movement parameters, including the speed and direction, of the mobile communications device;
   a content container that stores content related to the future location;
   a connection management module that provides network connectivity to the mobile communication device; and
   a caching module that
      identifies a suitable content type that accords in scale and context with the current movement parameters;
      selects the content related to the future location from the content container or retrieves content from an alternative content source external to the mobile communication device via the connection management module; and
      determines whether there is room in the content container to store the retrieved content and, upon a determination that there is insufficient room in the content container to store the retrieved content, compares content presently stored in the cache to the present location, deletes a portion of the content presently stored in the content container that is least related to the future location of the mobile communication device or the identified suitable content type, and stores the retrieved content in the content container; and a content server that provides the content related to the future location to the mobile communication device via a network; and a source of present location information about the mobile communication device accessible by the mobile communication device.

10. The location-based caching system of claim 9, wherein the mobile communication device further comprises a user interface; and the source of present location information comprises data entered into the mobile communication device via the user interface by a user.

11. The location-based caching system of claim 9, wherein the mobile communication device further comprises a user interface; and the content related to the future location is presented to a user via the user interface.

12. The location-based caching system of claim 11, wherein the content is a map and the user interface is a visual display.

13. The location-based caching system of claim 9, wherein the source of present location information comprises a global positioning system service; and the mobile communication device further comprises a global positioning system receiver.

14. The location-based caching system of claim 9, wherein the source comprises a collection of communication signals; and the location determination module in the mobile communication device is adapted to triangulate a present location of the mobile communication device based upon the collection of communication signals.

15. A mobile communication device providing location-based caching functionality comprising
   a location determination module that determines a present location, speed, and direction of the mobile communication device;
   a direction estimator module that estimates a future location of the mobile communication device based upon current movement parameters of the mobile communications device;
   a content container that stores content related to the future location; a connection management module that provides network connectivity to the mobile communication device; and
   a caching module that
      identifies a suitable content type that accords in scale and context with the current movement parameters;
      selects content related to the future location and the suitable content type from the content container or retrieves content from an alternative content source external to the mobile communication device via the connection management module; and
      determines whether there is room in the content container to store the retrieved content and, upon a determination that there is insufficient room in the content container to store the retrieved content, compares content presently stored in the cache to the present location, deletes a portion of the content presently stored in the content container that is least related to the future location of the mobile communication device or the identified suitable content type, and stores the retrieved content in the content container.

16. The mobile communication device of claim 15 further comprising a user interface that presents the content related to the future location to a user.

17. The mobile communication device of claim 16, wherein the user interface comprises a visual display.

18. The mobile communication device of claim 15, wherein the location determination module is adapted to triangulate the present location of the mobile communication device based upon a collection of communication signals.

19. The mobile communication device of claim 15, wherein the location determination module further comprises a global positioning system receiver.

* * * * *